US012686172B2

(12) United States Patent

Bernardy et al.

(10) Patent No.: US 12,686,172 B2
(45) Date of Patent: Jul. 21, 2026

(54) 3D PRINTER AND METHODS OF WELDING 3D PRINTED ITEMS

(71) Applicant: Government of the United States, as represented by the Secretary of the Air Force, Wright-Patterson AFB, OH (US)

(72) Inventors: Ryan Bernardy, Guthrie, OK (US); Thomas Koemel, Stillwater, OK (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 254 days.

(21) Appl. No.: 18/380,243

(22) Filed: Oct. 16, 2023

(65) Prior Publication Data

US 2025/0121563 A1     Apr. 17, 2025

(51) Int. Cl.
| | |
|---|---|
| *B29C 65/10* | (2006.01) |
| *B29C 64/209* | (2017.01) |
| *B29C 64/295* | (2017.01) |
| *B33Y 40/20* | (2020.01) |
| *B29C 64/188* | (2017.01) |
| *B33Y 10/00* | (2015.01) |
| *B33Y 30/00* | (2015.01) |

(52) U.S. Cl.
CPC .......... *B29C 64/295* (2017.08); *B29C 64/209* (2017.08); *B29C 65/10* (2013.01); *B33Y 40/20* (2020.01); *B33Y 10/00* (2014.12); *B33Y 30/00* (2014.12)

(58) Field of Classification Search
CPC ........ B33Y 40/20; B29C 65/10; B29C 65/103
See application file for complete search history.

(56) References Cited

U.S. PATENT DOCUMENTS

| | | | |
|---|---|---|---|
| 9,969,000 B2 | 5/2018 | Witney et al. | |
| 10,286,613 B2 * | 5/2019 | Weimer | B33Y 70/00 |
| 10,518,490 B2 * | 12/2019 | Wicker | B33Y 10/00 |
| 10,875,242 B2 * | 12/2020 | Saito | B29C 64/20 |
| 11,110,662 B2 * | 9/2021 | Newell | B29C 64/227 |
| 11,400,535 B2 | 8/2022 | Yamasaki et al. | |

(Continued)

FOREIGN PATENT DOCUMENTS

| | | | | |
|---|---|---|---|---|
| DE | 102017100258 A1 * | 2/2018 | .......... | B29C 64/106 |
| DE | 102021124575 A1 * | 3/2023 | ............ | B29C 33/52 |

(Continued)

OTHER PUBLICATIONS

"Bonding and Gluing FDM and Polyjet Parts". Objective 3D. Accessed Nov. 26, 2025 at www.objective3d.com.au/solutions/finishing-processes/bonding-and-gluing/. Published Aug. 18, 2017. (Year: 2017).*

(Continued)

*Primary Examiner* — Atul P. Khare

(74) *Attorney, Agent, or Firm* — AFMCLO/JAZ; Jeffrey V. Bamber

(57) ABSTRACT

A 3D printer and methods for hot air welding of 3D printed items within a printing operation of the 3D printer are disclosed. These methods allow for a controlled weld between either similar or dissimilar (miscible or immiscible) 3D printed materials with hot air heated from jets near the printer head or heads.

16 Claims, 4 Drawing Sheets

(56)     References Cited

U.S. PATENT DOCUMENTS

| | | | | |
|---|---|---|---|---|
| 11,440,115 | B2 | 9/2022 | Pfeffer et al. | |
| 11,446,739 | B2 | 9/2022 | Holcomb et al. | |
| 11,491,718 | B2 | 11/2022 | Sealy et al. | |
| 2002/0129485 | A1* | 9/2002 | Mok | B29C 64/188 |
| | | | | 29/527.2 |
| 2016/0175934 | A1 | 6/2016 | Acy et al. | |
| 2020/0049415 | A1 | 2/2020 | Schiffres et al. | |
| 2020/0180083 | A1* | 6/2020 | Richard | B22F 7/064 |
| 2022/0055299 | A1* | 2/2022 | Jähnicke | B29C 64/268 |
| 2022/0362849 | A1 | 11/2022 | Osgood et al. | |

FOREIGN PATENT DOCUMENTS

| | | | | |
|---|---|---|---|---|
| DE | 102023111420 | A1 * | 11/2024 | B33Y 10/00 |
| WO | 2020/249998 | A2 | 12/2020 | |

OTHER PUBLICATIONS

Garrett, Chris. "5 Ways to Bond and Glue 3D Printed Parts". Maker Hacks. Accessed Nov. 26, 2025 at www.makerhacks.com/bond-glue-3d-printed-parts/. Published May 17, 2017. (Year: 2017).*

"Taking Your Product to the Finishing Line". Stratasys Direct. Accessed Nov. 26, 2025 at https://www.stratasys.com/en/stratasysdirect/resources/articles/finishing-3d-printed-products/. Published Dec. 13, 2021. (Year: 2021).*

Sprovieri, John. "Hot-gas welding of plastic parts". Assembly Magazine. Accessed Nov. 26, 2025 at https://digital.bnpmedia.com/publication/?i=647287&article_id=3584033. Published Feb. 4, 2020. (Year: 2020).*

Uncle Jessy, Six Ways to Join 3D Printed Parts Together, published on the internet by Adafruit Industries on Apr. 26, 2022 at https://blog.adafruit.com/2022/04/26/six-ways-to-join-3d-printed-parts-together/.

* cited by examiner

3D PRINTER AND METHODS OF WELDING 3D PRINTED ITEMS

RIGHTS OF THE GOVERNMENT

The invention described herein may be manufactured and used by or for the Government of the United States for all governmental purposes without the payment of any royalty.

FIELD OF THE INVENTION

The present invention relates generally to 3D printing and, more particularly, to a 3D printer and methods of welding 3D printed items within a printing operation of a 3D printer.

BACKGROUND OF THE INVENTION

It is often desirable to join 3D printed parts together. For instance, in some cases, it may be difficult to 3D print an entire article on a 3D printer due to its size or configuration. In such cases, it may be necessary to 3D print portions of the article separately, and thereafter join the portions together. The 3D printed parts may be made of similar or dissimilar materials. Joining 3D printed parts that are made of dissimilar materials presents the added challenge of dealing with the potential incompatibility of bonding the materials together with conventional mechanisms.

Current methods for joining 3D printed parts include: 1) using adhesive bonding mechanisms; 2) joining the parts with snap-fit joints; 3) designing threaded connections into the parts; 4) using nuts and bolts; and 5) joining the parts using heat-set inserts. Adhesive bonding mechanisms include: adhesives such as Super Glue to adhere the parts; using acetone to fuse the components; welding using a 3D printing pen that melts filament into the seam between the parts; melting the pieces together using a wood burner or soldering iron; and using a plastic welding gun. The current method for joining dissimilar 3D printed components is by hand with a hot air welder. These current methods can be time-consuming and can lack precision.

Therefore, a need exists for improved 3D printers and improved methods for joining 3D printed components. In particular, a need exists for methods of producing higher quality 3D printed components, including those made from dissimilar materials that could not otherwise be manufactured by 3D printing alone. Improved methods are desirable to reduce the need for post processing and assembling 3D printed components made from immiscible materials.

SUMMARY OF THE INVENTION

The present invention relates generally to 3D printing and, more particularly, to a 3D printer and methods of welding 3D printed items within a printing operation of a 3D printer.

While the invention will be described in connection with certain embodiments, it will be understood that the invention is not limited to these embodiments. To the contrary, this invention includes all alternatives, modifications, and equivalents as may be included within the spirit and scope of the present invention.

In one embodiment of the present invention a 3D printer is provided. The 3D printer comprises: a printer bed; a movable printer head disposed over the printer bed; a hot air welding head disposed over the printer bed wherein the hot air welding head is movable over the printer bed; and at least one controller in communication with the printer head and the hot air welding head for controlling the printer head and the hot air welding head.

In another embodiment, a method of joining 3D printed components on the bed of a 3D printer is provided. The 3D printer comprises a printer bed, a printer head, and a hot air welder. The method comprises:

a) providing a first 3D printed component on the bed of a 3D printer, the first 3D printed component comprising a first material;

b) providing a second 3D printed component on the bed of a 3D printer, the second 3D printed component comprising a second material;

c) placing at least portions of the first 3D printed component and second 3D printed component adjacent to each other on the bed of the 3D printer with an interface therebetween;

d) applying a welding material onto the first 3D printed component and the second 3D printed component at the interface; and e) using the hot air welder to join the first 3D printed component to the second 3D printed component with the welding material.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity of illustration.

DETAILED DESCRIPTION OF THE INVENTION

The present invention relates generally to 3D printing and, more particularly, to a 3D printer and methods of welding 3D printed items within a printing operation of a 3D printer.

The term "welding", as used herein, refers to hot air welding, which is also known as hot gas welding. Hot air welding is a process used to join two or more thermoplastic materials together using a controlled stream of heated air, and, in some cases, with a welding material such as a flux material. Hot air welding may take place with air temperatures ranging between about 700° F. and 1,350° F. The temperatures of the portions of the thermoplastic materials being joined together will be in a lower range.

Hot air welding differs from joining materials by adhesives in several respects. Adhesives generally cure from exposure to ambient air, heat, or UV and bond to the surface of the two members being joined (that is, by surface adhesion). Welding the members, on the other hand, typically involves a melting and mixing of the materials of the members, and/or a melting and mixing of a welding material (or flux material) into the materials of the members to form a chemical bond beyond surface adhesion. Hot air welding also takes place at temperatures considerably higher than those used with high temperature glue guns (which normally melt glue sticks at temperatures of up to 380° F.).

The welding step may take place within a single print operation. The term "single print operation", as used herein, refers to as the series of operations or processes that are required to complete an item that is on the printer bed that is then removed from the printer.

Figure 1:
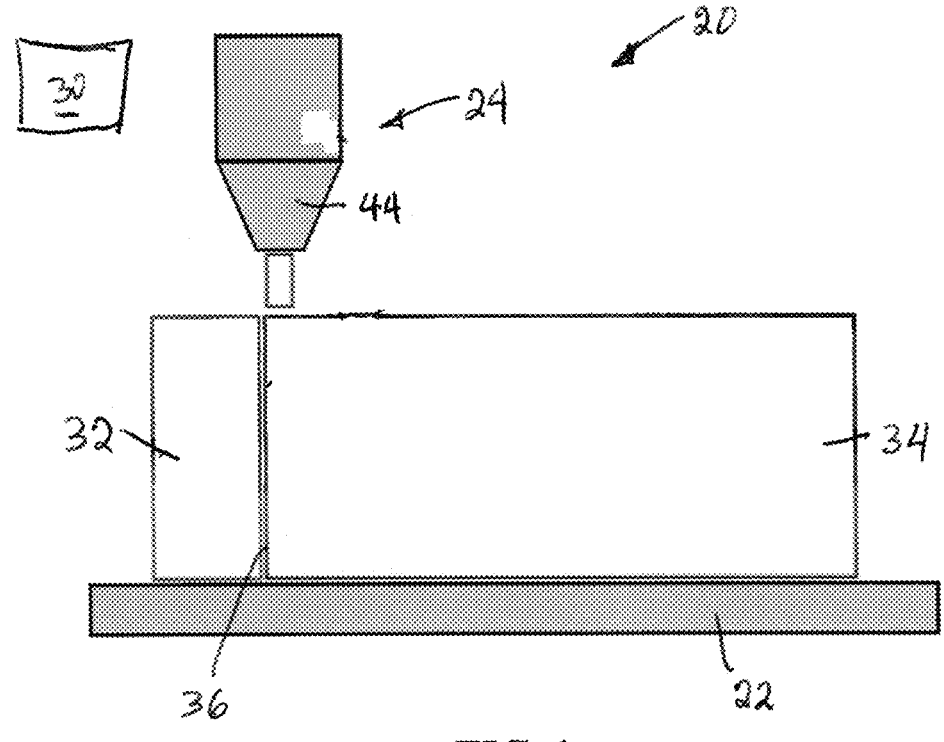
FIG. 1 is a schematic side view showing portions of a 3D printer with two 3D printed components on the print bed.
Figure 2:
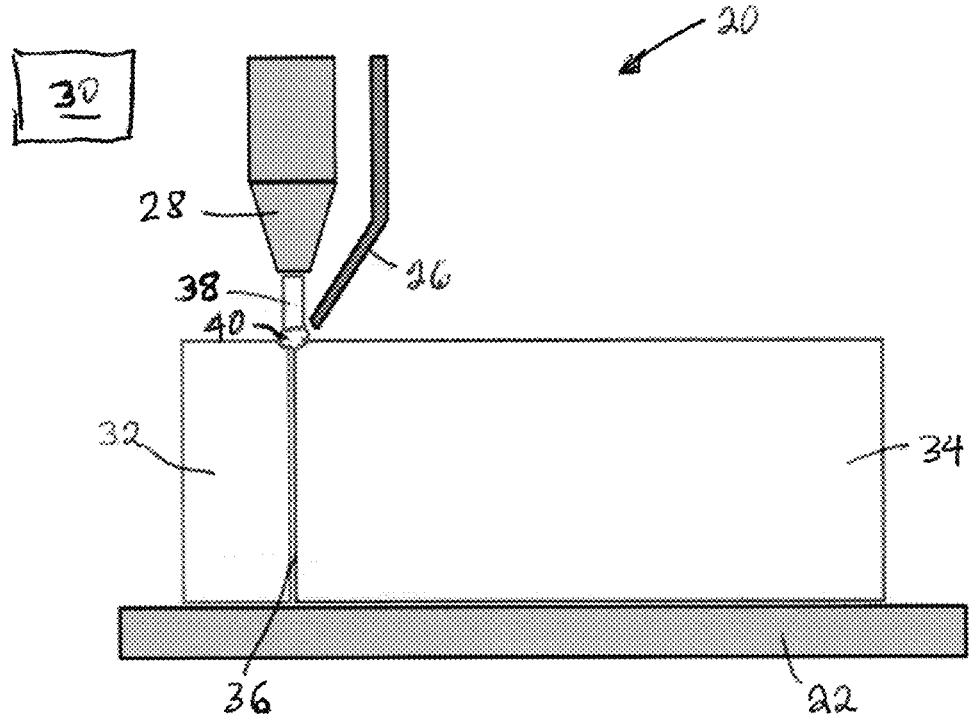
FIG. 2 is a schematic side view similar to FIG. 1 showing a step of welding the two 3D printed components on the print bed.

FIGS. 1 and 2 show the relevant portions of a 3D printer 20 according to the present invention. The 3D printer 20 comprises a printer bed 22; a printer head 24 disposed over the printer bed which is movable over the printer bed; a hot air welding head 26 disposed over the printer bed which is movable over the printer bed; a dispenser 28 such as a reel feeder that is disposed over the printer bed and which is movable over the printer bed; and at least one controller 30 in communication with the printer head, the hot air welding head, and the dispenser 28 for controlling the printer head 24, the hot air welding head 26, and the dispenser 28. The printer head 24 has a nozzle 44 at one end.

The 3D printer 20 is configured to build articles on the printer bed 22 in an additive manner by laying down layers of material. The 3D printer 20, aside from being provided with the movable hot air welding head 26, dispenser 28 and the ability to dispense a welding material, can comprise components similar to conventional 3D printers. The 3D printer 20 also differs from conventional 3D printers in that the at least one controller 30 of the 3D printer 20 comprises and utilizes software code that is in operative communication with the printer head 24, the welding head 26, and the dispenser 28 to accommodate a welding step within the printing process.

The 3D printer 20 is described as comprising at least one controller 30. This means that the 3D printer is not limited to a configuration in which a single controller controls the printer head 24, the hot air welding head 26, and the dispenser 28. The 3D printer 20 can either have a single controller 30 for controlling the printer head 24, the hot air welding head 26, and the dispenser 28; or it can have separate controllers for controlling the printer head 24, the hot air welding head 26, and the dispenser 28. The at least one controller 30 can be in wired or wireless communication with the aforementioned components of the printer 20.

The software code may have the ability to interact with the printer 20 and the print drives to allow for complex slicing of print files. The software code may comprise anti-collision programming in operative communication with the printer head 24, the welding head 26, and the dispenser 28 to ensure that the welding head 26 and/or the welding material dispenser 28 do not collide with the printer head 24 during the process described herein. The printer 20 may also comprise anti-collision hardware and/or tool changers. An example of a tool changer is a mechanism for changing extruders on the printer.

FIG. 1 shows a first 3D printed component 32 on the bed 22 of the 3D printer 20 and a second 3D printed component 34 on the bed 22 of the printer. The first 3D printed component 32 is comprised of a first material. The second 3D printed component 34 is comprised of a second material. It should be understood that the terms "first", "second", "third", etc., as used herein, are used only to distinguish one element or component from another, and do not necessarily imply a sequence or order, or a difference in chemical composition, unless clearly indicated by the context. In addition, while two 3D printed components are shown in the drawings, any suitable number of 3D printed components can be welded together using the method described herein.

In certain embodiments, the first 3D printed component 32 and second 3D printed component 34 are both formed by printing these components using the 3D printer 20. These components can be printed during the same (single) printing operation, but are not initially joined together. At least portions of the first 3D printed component 32 and second 3D printed component 34 are positioned adjacent to each other on the bed 22 of the 3D printer. These two components have an interface 36 therebetween. The portions of the first 3D printed component 32 and the second 3D printed component 34 can be in contact with each other at the interface 36, or they can have a gap therebetween.

Although FIGS. 1 and 2 show the first 3D printed component 32 and second 3D printed component 34 positioned side-by-side on the printer bed 22, they are not limited to being in such an arrangement. The first 3D printed component 32 and second 3D printed component 34 can be positioned in any locations relative to each other (including, but not limited to stacked where one component is on top of the other, or which partially covers the other component) as long as there is an interface between the components that is accessible to the welding head 26.

The first and second materials may comprise any material(s) known for use in 3D printing. Typically, the first and second materials will comprise thermoplastic polymeric materials that are provided to the printer in the form of filaments. The materials can alternatively be provided in the form of powders or potentially in the form of liquids. The thermoplastic polymeric materials may include, but are not limited to: polylactic acid (PLA), acrylonitrile butadiene styrene (ABS), polyvinyl alcohol (PVA), and polycarbonate (PC). Examples of powder materials include, but are not limited to polyamide (Nylon) and alumide. The first and second materials may typically exclude metals.

The materials used to print the first and second components 30 and 32 can be the same, or they can be different. The materials used to print the first and second components 32 and 34 can be the miscible, or they can be immiscible. The term "miscible", as used herein, refers to liquids which when combined in any proportion or concentration, form a homogeneous mixture. The term "immiscible", as used herein, refers to liquids that are incapable of mixing and attaining homogeneity. When the materials used to print the first and second components 32 and 34 are immiscible, it is generally not possible to bond (or join) the first and second components together with the printing process alone.

FIGS. 1 and 2 show one method of joining 3D printed components on the bed of a 3D printer. The method may comprise:

a) providing a first 3D printed component 32 on the bed 22 of a 3D printer 20, the first 3D printed component 32 comprising a first material;

b) providing a second 3D printed component 34 on the bed of a 3D printer, the second 3D printed component 34 comprising a second material;

c) placing at least portions of the first 3D printed component 32 and second 3D printed component 34 in positions in which they are located adjacent to each other on the bed of the 3D printer with an interface 36 therebetween;

d) applying a welding material 38 onto the first 3D printed component 32 and the second 3D printed component 34 at the interface 36; and e) using the hot air welder 26 applied to the welding material 38 to join the first 3D printed component 32 to the second 3D printed component 34.

In the typical case, the step a) of providing a first 3D printed component on the bed of a 3D printer comprises printing the first 3D printed component 32 using the printer 20; and the step b) of providing a second 3D printed component on the bed of a 3D printer comprises printing the second 3D printed component 34 using the printer.

The terms "welding material" (or "flux material"), as used herein are synonymous, and refer to a material 38 that is used to hot air weld the first 3D printed component 32 and the second 3D printed component 34 at the interface 36 therebetween. The welding material 38 may be in any suitable form including, but not limited to in the form of a liquid, a solid material which may be in the form of pellets, or which is on a reel or in the form of a rod. In some cases, the welding material 38 may comprise the same material as the first material and/or the second material. In other cases, such as when the first and second materials are non-miscible, the welding material 38 may comprise an intermediary material that is miscible with both the first material and the second material. In certain cases, however, a separate welding material may not be necessary. Such cases may include processes like autogenous welding, friction welding, pinch welding, etc.

Generally, however, a welding material 38 is used because it can be difficult to have good penetration and adhesion between two components that are sitting on a level print bed since most materials tend to sag in the direction of gravitational pull as they are melted. The welding material 38 helps to fill the void as the two unbonded members of a print begin to melt around areas where they are to be bonded.

The welding material 38 may be dispensed and applied by a dispenser 28, which may include, but is not limited to a reel feeder with a nozzle, a solid material feeder such as a pellet feeder, or a printer head. In some cases, the welding material 38 may be printed by the printer head 24 (in which case there need not be a separate dispenser 28). Typically, the welding material will need to be preheated (such as by passing the same through an extruder) if it will be printed. If the welding material 38 is printed by the printer head 24, the printer head 24 may be a multi-feed printer head, and/or the printer head 24 may undergo a material change cycle after printing the material(s) of the first 3D printed component 32 and second 3D printed component 34 prior to printing the welding material 38.

The welding material 38 may be dispensed any suitable number of times (that is, by any desired number of passes) and in any suitable amount during a printing operation. If the gap at the interface 36 between the printed components is relatively narrow, it may only be necessary to make one pass of the welding material dispenser 28 along or across the interface 36. If, on the other hand, the gap at the interface 36 between the printed components is larger than the width of the dispensed welding material (that is, the "bead" of welding material), then it may be necessary to make more than one pass with the welding material to fill the gap.

There are numerous, non-limiting embodiments of the invention. All embodiments, even if they are only described as being "embodiments" of the invention, are intended to be non-limiting (that is, there may be other embodiments in addition to these), unless they are expressly described as limiting the scope of the invention. Any of the embodiments described herein can also be combined with any other embodiments in any manner to form still other embodiments.

In some embodiments, it is possible to utilize the method described herein to join 3D printed components together on a printer bed in which the 3D printed components are not welded in a single print operation. Thus, one or more of the 3D printed components could be removed from the printer bed after formation, and then placed back on the printer bed for welding to another component.

In addition, in a first example, which may be illustrated by FIGS. 1 and 2, the first material comprising the first component 32 and the second material comprising the second component 34 have the same chemical composition. The first component 32 is printed on the printer bed 22 from the first material and the second component 34 is printed on the printer bed 22 from the second material during a single print operation. The printer head 24 is controlled by at least one controller and is movable in a first area or location during the printing of the first and second components 32 and 34.

The printer head 24 may stop moving after the first and second components 32 and 34 have been printed. The first and second components 32 and 34 are adjacent to each other on the bed 22 of the 3D printer 20, but they are not bonded together. There is an interface 36 between the first and second components 32 and 34. The first and second components 30 and 32 may be in contact with each other at the interface 36, or there may be a gap between the first and second components 32 and 34.

After printing the first and second components 32 and 34, the at least one controller 30 may cause the printer head 24 to be movable away from the first area or location (that the printer head 24 occupied during printing) to a second location (out of the view in FIG. 2) to make room for the hot air welding head 26 and dispenser 28 to move into position. The welding head 26 and dispenser 28 move into the area of the interface 36. The dispenser 28 will dispense the welding material 38. The hot air welding head 26 will apply hot air to the welding material 38 to bond the first and second components 32 and 34 at the interface 36. In this example, the welding material 38 may have the same chemical composition as the first and second materials. In such a case, the separate welding material dispenser 28 is not necessary, and the welding material 38 may be dispensed from the printer head 24 instead.

The hot air welding head 26 can comprise a tube that is connected to a source of hot air. The hot air welding head 26 directs hot air to both of the surfaces of the first component 32 and the second component 34 in the area to be welded at the interface 36 and onto the welding material 38 in order to form the weld. In some cases, this may be the final step in the print operation and the article comprising the bonded first and second components 32 and 34 can be removed from the print bed 22. If the weld is not the final step in the print operation, the printer 20 can resume the printing operation and continue to print over the weld 40.

In a second example, which may also be illustrated by FIGS. 1 and 2, the first material comprising the first component 32 and the second material comprising the second component 34 are miscible. The first component 32 is printed on the printer bed 22 from the first material and the second component 34 is printed on the printer bed 22 from the second material during a print operation. The first and second components 32 and 34 are adjacent to each other on the bed 22 of the 3D printer 20 with an interface 36 therebetween, but are not bonded together. In this second example, the movement of the printer head 24 and the hot air welding head 26, and all other aspects, may be the same as in the first example. In this second example, however, the welding material may comprise either the first material or the second material.

In a third example, which may also be illustrated by FIGS. 1 and 2, the first material comprising the first component 32 and the second material comprising the second component 34 are immiscible. In this case, where the first material comprising the first component 32 and the second material comprising the second component 34 are immiscible, the welding material may comprise a third material that is miscible with both the first material and the second material. Otherwise, everything else in the third example may be the same as in the first example.

Figure 3:
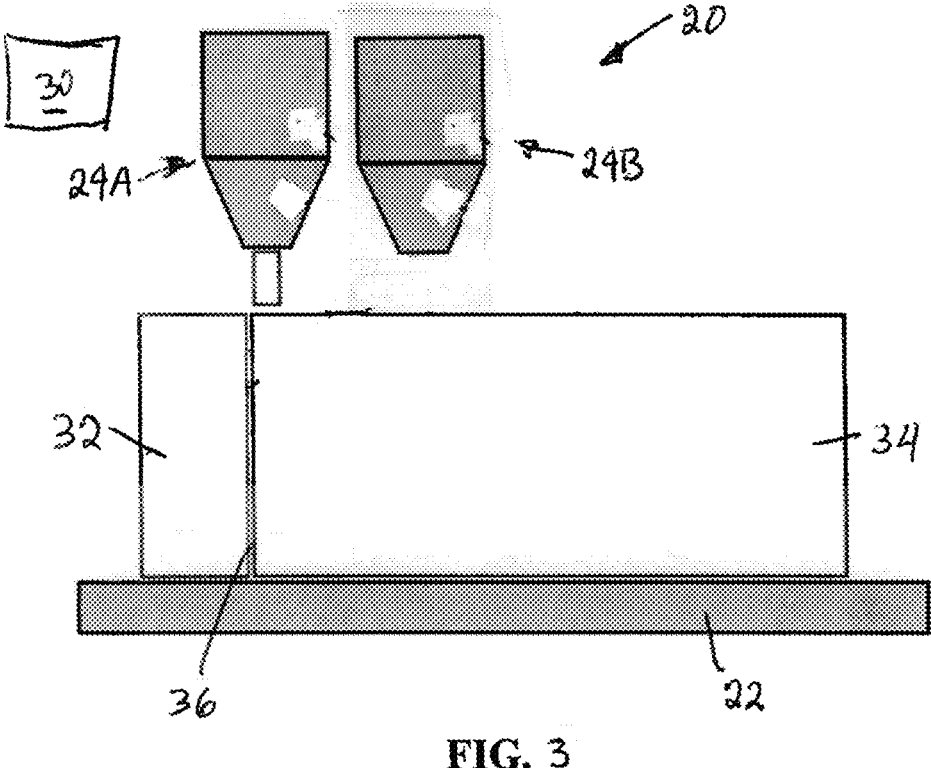
FIG. 3 is a schematic side view similar to FIG. 1 showing a 3D printer with multiple print heads.

In other embodiments, rather than using a single print head 24, multiple print heads, or a multi-feed print head could be used. When a single print head 24 is used, each material passing through the nozzle 44 could theoretically be pushed out through the nozzle during a material change before returning the print head 24 back to the point of the 3D print where the print head finished printing one material in order to resume printing with a new material. This will take time for the print head 24 to move away from the print and change materials. It is desirable to flush out all of the non-miscible materials from a shared printer head 24 and nozzle 44 during a material change to avoid introducing unbound material and stress risers into the 3D print. Increasing the speed in this process can be accomplished by adding multiple print heads such as 24A and 24B shown in FIG. 3, or a multi-feed print head 24 such as shown in FIGS. 4 and 5 so that the different materials are "preloaded" then there would be no time lost to a material change.

Figure 4:
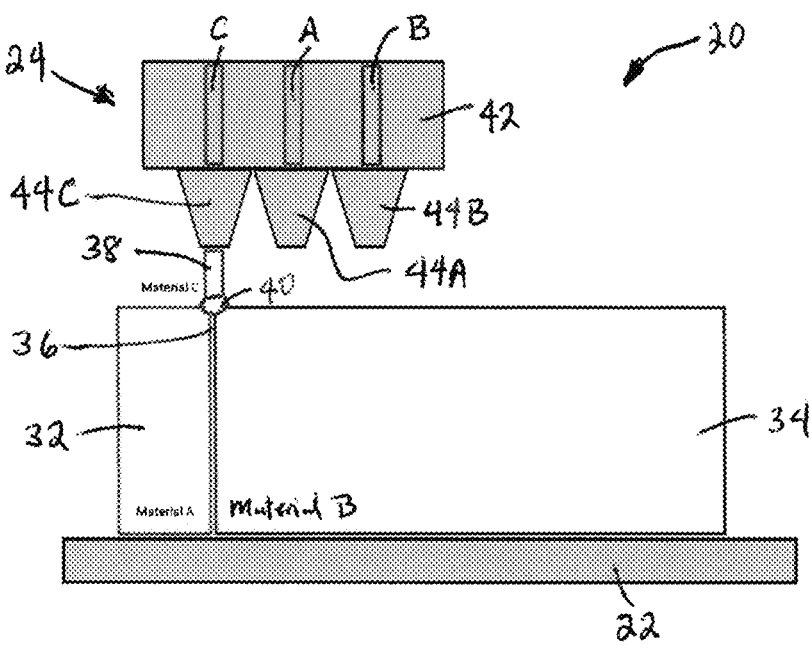
FIG. 4 is a schematic side view similar to FIG. 2 showing a step of welding the two 3D printed components on the print bed using a multi-material feed printer head with individual nozzles for different materials.

FIG. 4 shows a step of welding the two 3D printed components on the print bed using a printer head 24 with a multi-material feed 42 and individual nozzles 44A, 44B, and 44C for different materials A, B, and C, respectively. In the embodiment shown in FIG. 4, for example, the first 3D printed component 32 can be printed with material A through nozzle 44A. The second 3D printed component 34 can be printed with material B through nozzle 44B. Material B is not miscible with material A, but is miscible with material C. Material C is then printed through nozzle 44C into the interface 36 between the first and second 3D printed components 32 and 34 to weld the components together.

Figure 5:
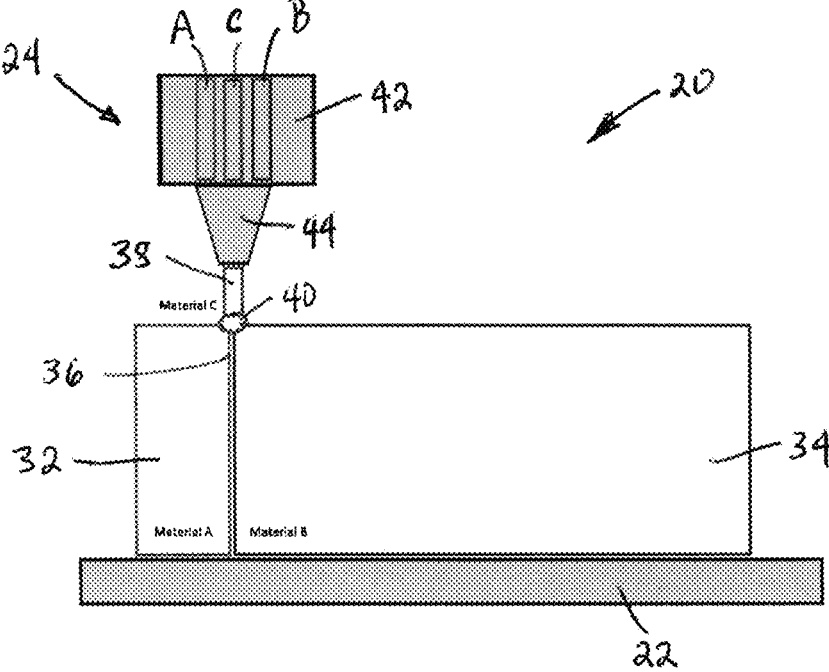
FIG. 5 is a schematic side view similar to FIG. 2 showing a step of welding the two 3D printed components on the print bed using a multi-material feed printer head with a shared nozzle for different materials.

FIG. 5 shows a step of welding the two 3D printed components on the print bed using a printer head 24 with a multi-material feed 42 and a shared nozzle 44 for different materials A, B, and C.

Figure 6:
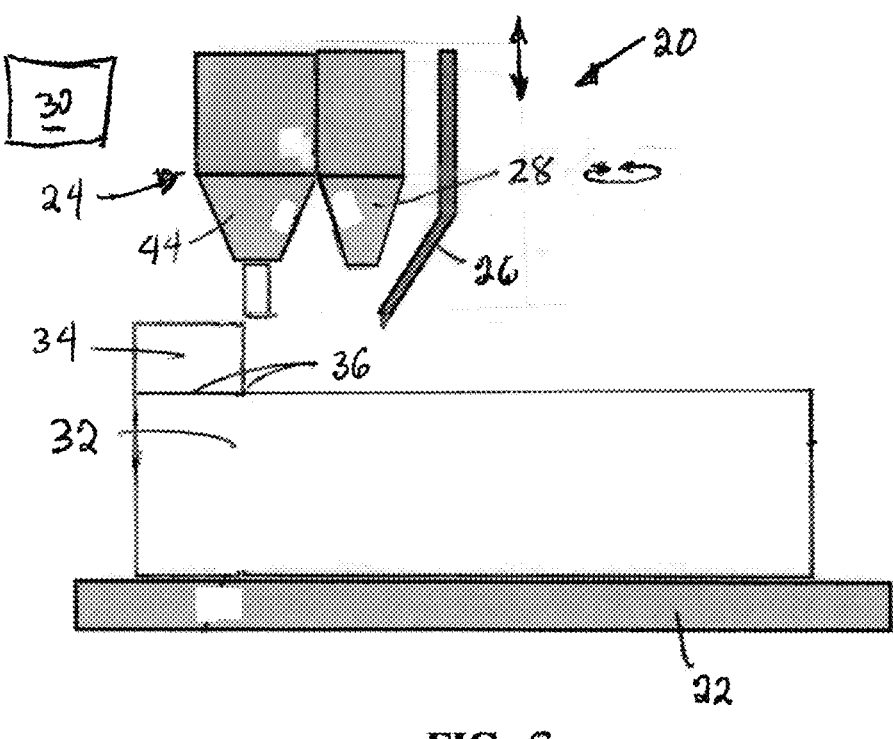
FIG. 6 is a schematic side view showing portions of a 3D printer having a printer head, a hot air welding head, and a welding material dispenser provided on a combined head, and two 3D printed components where one 3D printed component is stacked on the other.

FIG. 6 shows that in variations of the 3D printer 20 and the methods described herein, any two or more of the printer head 24, the hot air welding head 26, and dispenser 28 can be provided on a combined head, such as a combined printing head or a combined printing/welding head. In such a case, the combined elements will be movable together during the printing and welding steps so that there is no possibility for the printer head 24 and the hot air welding head 26 and dispenser 28 to collide when carrying out the method described herein. FIG. 6 also shows an embodiment where one 3D printed component is stacked on the other, rather than being positioned side-by-side. The combined head may be movable upward and downward, and may be rotatable as shown by the arrows in order to facilitate the welding.

It is also possible that a 3D printer and the method described herein can be configured to be used in metal 3D printing processes in which the first and second materials comprise metals. In such cases, conventional metal welding techniques will be used to weld the components together, rather than hot air welding as described above. In such cases, a higher temperature will be required to melt the welding material in order to form the weld, and the temperature may need to be high enough to melt localized portions of the first and second materials.

As used herein, an element or step recited in the singular and preceded with the word "a" or "an" should be understood as including the plural of such elements or steps, unless the plural of such elements or steps is specifically excluded.

The method described herein can provide a number of advantages. It should be understood, however, that these advantages need not be required unless they are set forth in the appended claims.

The use of in print hot air welding can allow for complex items to be manufactured out of otherwise immiscible materials all within the same print. The traditional means combining immiscible components is some form of post processing such as manually hot air welding, using adhesives, the use of fasteners or printing the components with design elements that allow for the immiscible components to be assembled mechanically. A machine controlled hot air weld is more precise and repeatable than a manual hot air weld. This can result in better quality manufactured items with minimal post processing and better resolution between bonded components.

The term "joined", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A 3D printer comprising:
a printer bed;
a movable printer head disposed over said printer bed;
a hot air welding head disposed over said printer bed, wherein said hot air welding head is movable over the printer bed; and
at least one controller in communication with said printer head and said hot air welding head for controlling said printer head and said hot air welding head, wherein said at least one controller is configured to cause said printer head to print material on the printer bed in an additive manner by laying down layers of the material on the printer bed in order to build articles on the printer bed comprising a first 3D printed component comprised of a first material and a second 3D printed component comprised of a second material, wherein said first material and said second material are immiscible, and said at least one controller is configured to cause said printer head to print said first 3D printed component and said second 3D printed component on said printer bed in a position adjacent to each other with an interface therebetween such that said first and second 3D printed components are not initially joined together, wherein said at least one controller is configured to move said hot air welding head over the printer bed into the area of the interface between said first and second 3D printed components and to cause said hot air welding head to weld the first and second 3D printed components together at said interface.

2. The 3D printer of claim 1, wherein said at least one controller is configured to cause the hot air welding head to move into position to weld together said first and second 3D printed components on said printer bed.

3. The 3D printer of claim 2, wherein said printer head is in a first location during printing of said first and second 3D printed components, and through said at least one controller, the printer head is movable away from the first location of printing to a second location to make room for the hot air welding head to move into position for welding said components.

4. The 3D printer of claim 2, wherein the first 3D printed component and the second 3D printed component that are in a position adjacent to each other on the printer bed are located side-by-side on the printer bed.

5. The 3D printer of claim 2 further comprising a welding material dispenser that is configured to dispense a welding material for welding the first 3D printed component and the second 3D printed component together.

6. The 3D printer of claim 2, wherein said movable printer head comprises a nozzle that is configured to print both the first material for making the first 3D printed component and the second material for making the second 3D printed component.

7. The 3D printer of claim 2, wherein said movable printer head comprises first and second movable printer heads each for respectively printing said first material and said second material.

8. The 3D printer of claim 2, wherein said movable printer head is one of multiple print heads joined together, wherein each of said print heads comprises a separate material feed and a nozzle.

9. The 3D printer of claim 2, wherein said movable printer head comprises a single nozzle and multiple material feeds that are configured to be dispensed through said single nozzle.

10. The 3D printer of claim 2, wherein said movable printer head and said hot air welding head are provided on a combined head.

11. A 3D printer comprising:
a printer bed;
a first movable printer head disposed over said printer bed, said first movable printer head provided with a supply of a first material for 3D printing a first component on said printer bed;
a second movable printer head disposed over said printer bed, said second movable printer head provided with a supply of a second material immiscible with said first material for 3D printing a second component on said printer bed;
a movable welding material dispenser disposed over said printer bed, said welding material dispenser containing a welding material;
a hot air welding head disposed over said printer bed, wherein said hot air welding head is movable over the printer bed to weld the first 3D printed component to the second 3D printed component on said printer bed; and
at least one controller in communication with said first printer head, said second printer head, and said hot air welding head, said at least one controller configured to control said first printer head and said second printer head to respectively print said first component and said second component adjacent to each other on the printer bed with an interface therebetween such that the first and second components are not initially joined together, wherein said at least one controller is further configured to control said hot air welding head to perform said welding at said interface.

12. The 3D printer of claim 11, wherein the welding material comprises an intermediary material that is miscible with both the first material and the second material.

13. A method of joining 3D printed components on the bed of a 3D printer according to claim 1, said method comprising:

printing said first 3D printed component and said second 3D printed component on the bed of the 3D printer in the position adjacent to each other with the interface therebetween;

applying a welding material onto said first 3D printed component and said second 3D printed component at said interface; and joining said first 3D printed component to said second 3D printed component with said welding material by said hot air welder.

14. The method of claim 13, wherein the first 3D printed component and the second 3D printed component are located side-by-side on the printer bed.

15. The method of claim 13, wherein said welding material is miscible with both said first and second materials.

16. The method of claim 13, wherein the printer head stops moving during said joining of said first 3D printed component to said second 3D printed component.

\* \* \* \* \*